Patented Oct. 29, 1940

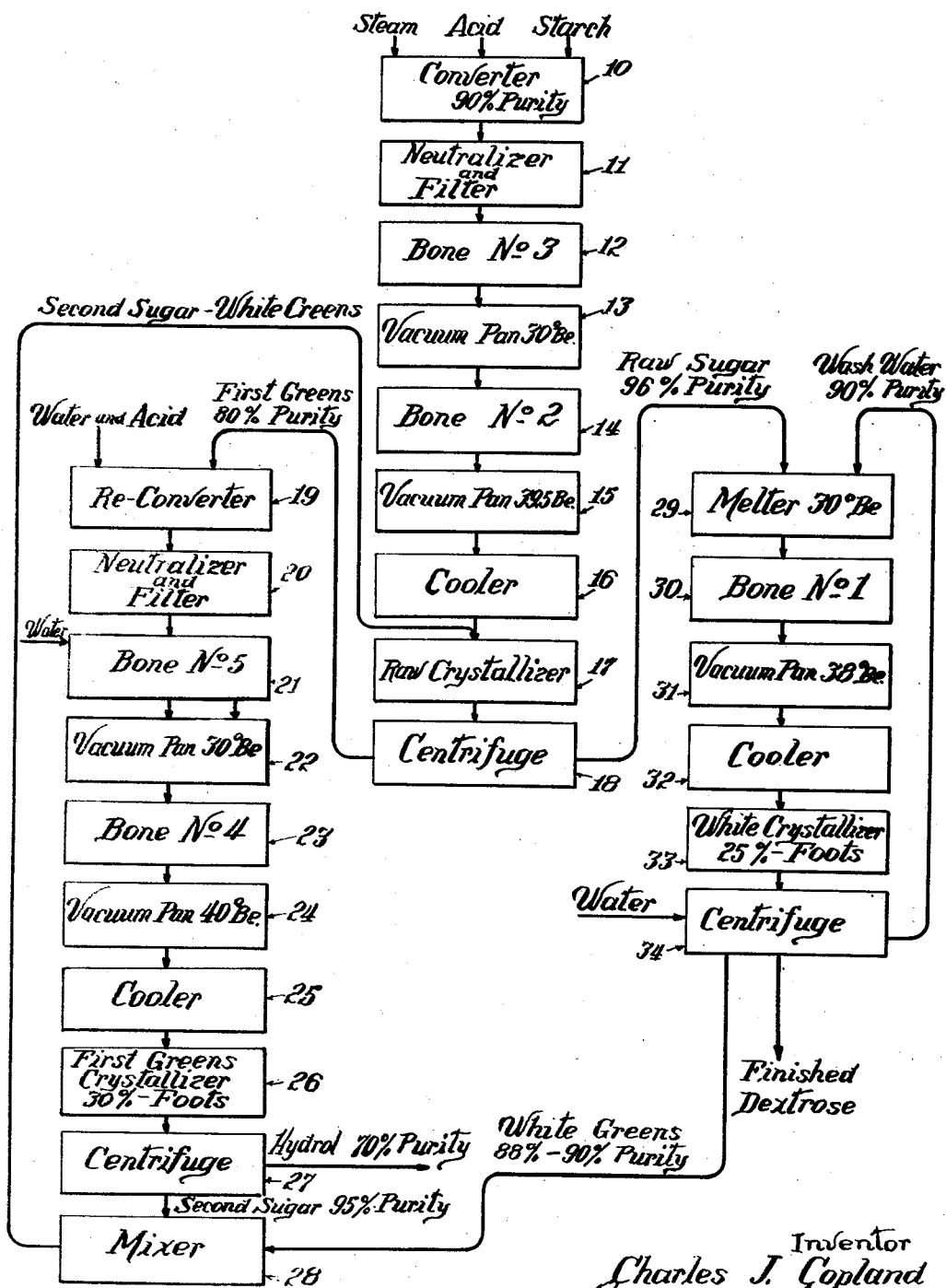

2,219,513

UNITED STATES PATENT OFFICE 2,219,513

CRYSTALLIZATION OF DEXTROSE HYDRATE

Charles James Copland, North Kansas City, Mo., assignor to Corn Products Refining Company, New York, N. Y., a corporation of New Jersey Application May 12, 1939, Serial No. 273,255

20 Claims. (Cl. 127—58)

This invention relates to the crystallization of high purity dextrose hydrate from starch converted dextrose solutions by the method of crystallization in motion and temperature reduction, according to which method the solid phase is kept in suspension and dispersed in the liquid phase during the crystallizing operations, under present practice, by means of slow moving agitators. The primary object of the invention is to provide a novel process whereby a purer, whiter and more lustrous crystalline dextrose hydrate can be produced than is possible with the present two-crystallization process without, however, any substantial increase in the amount of equipment used or other change in the process or apparatus involving substantial added cost.

A more specific object of the invention is to provide certain improvements upon the process of making high purity dextrose hydrate under United States patent to William B. Newkirk, No. 1,521,830, June 19, 1925. As this patented process is now practiced, it is a two-crystallization process in which the converted liquor is crystallized and the massecuite purged by centrifuging and washed with water for the production of final sugar; the mother liquor (first greens) from the centrifuging operation being refined, concentrated and recrystallized, and the product (second sugar) melted and mixed with converter liquor for a subsequent first crystallizing operation, as the process is continued. The mother liquor (hydrol) derived from the second crystallizing centrifuging operations is discharged from the process. In some cases the mother liquor from the first crystallizing operation is reconverted to increase its content of crystallizable dextrose before being recrystallized, in accordance, for example, with the process of United States patent to Charles J. Copland, No. 2,109,585, March 1, 1938.

A purer and whiter dextrose than is obtainable by the two-crystallization process, above referred to, can be produced by melting the dextrose obtained from the first crystallizing operation, and crystallizing dextrose from the melt; but this procedure necessitates additional equipment which increases very considerably the cost of production. In accordance with the present invention a dextrose sugar of improved purity, whiteness and lustre may be produced with substantially no additional equipment and at a cost substantially no greater than the cost of the two-crystallization process.

According to the present invention the sugar from the crystallization of the converter liquor, referred to as the "raw crystallization" is melted and recrystallized in an operation referred to herein as the "white crystallization" which yields the finished high purity dextrose of improved quality; and the mother liquor from the raw crystallization (first greens) is recrystallized in an operation referred to herein as the "first greens crystallization" from which the mother liquor (hydrol) is discharged from the process as it contains little or no available dextrose, ordinarily; although this liquor might be given another crystallization if its content of crystallizable dextrose should be sufficient to warrant the expense.

The process as thus far described, viz., raw and first greens crystallizations with the melting and recrystallization of the sugar from the raw crystallizer is not novel. See United States patent to Newkirk, No. 1,661,298, March 6, 1928. But in order to achieve applicant's principal object, viz., improved quality without substantial increase in cost of production, radical changes must be made in the known processes in which a high purity dextrose is melted and recrystallized, since these processes involve additional equipment and, therefore, additional expense. Applicant's present invention utilizes certain expedients, in novel combination, as will be hereinafter set forth, whereby the process of melting and recrystallization may be carried out without increase of apparatus or increase of cost of production over the two-crystallization process. Some of these expedients are optional, but are desirable if applicant's object is to be obtained in the fullest measure. These expedients may be summarized as follows:

(1) The sugar from the raw crystallization which is melted and sent to the white crystallization, and preferably also the second sugar, that is the sugar from the first greens crystallization, are not washed with water in the centrifugal machines. The only washing of centrifuged massecuite takes place in the centrifugal machines in which the massecuite from the white crystallization is purged. Inasmuch as the purity (reducing sugar calculated as dextrose) of the mother liquor of the white crystallization is high and because of the character of the impurities at this stage of the process is such that the massecuite of the white crystallization is easily purged, for reasons which will be hereinafter stated, only a small amount of water is necessary for washing the centrifuged sugar from the white crystallization to remove substantially all of its residual impurities. Therefore, in the first place, the amount of wash water which has to be returned to the process is much less than would have had to be returned if the sugars from the raw or the first greens crystallizations had been washed; and, in the second place, this wash water from the white crystallization sugar contains a smaller amount of impurities than wash waters from crystallizations at earlier stages of the process. As a result of the reduction in the amount of wash water that has to be returned to the process, the capacity of the raw and first greens crystallizers, measured in terms of converter liquor capable of being treated, is increased. This means that crystallizers used for first and second crystallizations in the two-crystallization process, may, according to the present invention, be used in the third or white crystallizing operation.

(2) In order to further increase crystallizing capacity of the raw and first greens crystallizers so as to release additional crystallizers to be used for white crystallizations, the entire massecuite from the raw crystallizer is centrifuged (instead of reserving about 30% as foots for seeding the next batch as has been customary) and this gives, when melted, a relatively large quantity of high purity liquor for the white crystallization and effectively increases the crystallizing capacity of the apparatus used for the first two stages of the process. That is, the space in the raw crystallizers which was occupied by foots, left after each operation, in carrying out the old two-step process, can, by the present process, be utilized—except for the part occupied by solid phase introduced into the crystallizer as will be described—for the treatment of fresh converter liquor. The solid phase necessary for seeding the raw crystallizer consists of centrifuged but not washed sugar from the first greens crystallization. The expedient of using a second sugar for seeding a white or final crystallization is disclosed, in connection with a two-step process, in United States patent to Ebert and Newkirk, No. 2,065,669, December 29, 1936. In applicant's present process, however, the sugar from the first greens crystallization is used for seeding a crystallizing operation, the sugar from which is melted and recrystallized to give the final product; and this method of seeding is one of the expedients whereby crystallizing space in the early stages is reduced to compensate for the additional equipment necessary for the final recrystallization so that the cost of the process involving melting and recrystallization is kept down substantially to the cost of a two-step process without melting and recrystallization. That is, by reserving washing of centrifuged massecuites to the final step in which dextrose is produced from a melted sugar and by utilizing all of the solid phase in the raw crystallization massecuite for the white crystallization and seeding the raw crystallization with second sugar from the white greens crystallization, it is possible, by adding to the old two-step process a third step of melting and recrystallization, to thereby obtain a final dextrose hydrate of improved quality without the expected use of additional equipment, and hence without substantial additional cost of operation.

(3) The purities of the liquors going to the different crystallizing operations are adjusted, in accordance with the present invention, so that all, or substantially all, of the crystallizable dextrose in the converted liquor, will be recovered in the three specified crystallizing operations. Crystallization in the type of process contemplated by this invention must be stopped when a certain density of massecuite, crystals in mother liquor, is attained. If the crystallization does not cease automatically for lack of solution of sufficient volume and/or concentration in the spaces between the crystals, it must be stopped arbitrarily or else the crystals will be disintegrated by being rubbed by the agitator and against each other through the action of the agitator. It does not follow, therefore, that the higher the purity of the liquor, the greater will be the yield of solid phase dextrose. Crystallizing conditions set a limit to the amount of dextrose that can be crystallized out of any liquor regardless of its purity; and if the purity is too high, recoverable dextrose will be lost in the final hydrol or can be recovered only by an additional crystallization. It is in accordance with this principle of not allowing the dextrose content to be higher than can be recovered in the intended crystallizing operation or operations that the sugar from the raw crystallization is not washed before being melted and sent to the white crystallization. If this sugar were washed, its purity would be so high as to necessitate either a second white crystallization; or a mother liquor would be derived from the white crystallization of such high purity that when returned to the process it would give the liquor with which it was mixed too high a purity for the crystallizing operation or operations in which such liquor was intended to be used resulting in a loss of dextrose in the hydrol.

The purity of the liquor to the white crystallization is, however, much higher than that of converter liquor (which is usually about 89%–90%), but this higher purity is compensated for in the white crystallization by operating at a lower liquor density, which has the advantage of a purer and less viscous mother liquor so that the white sugar massecuite is more readily purgeable than the other massecuites of the process, and the purged sugar is washable with less water. Because of the low density of the liquor going to the white crystallizer, the foots left in each case for seeding the next batch may be reduced in amount so that the effective crystallizing capacity of the white crystallizers is increased.

(4) According to the principle adverted to in the last paragraph, the mother liquor from the white crystallization (white greens) has a purity about the same as, or a trifle lower than, that of the converter liquor, and the second sugar is not washed, so that the mother liquor mixed with the converter liquor going to the raw crystallizer does not raise but slightly reduces the purity of the liquor to that crystallizer. If the purity of the liquor going to the raw crystallizer were high, due to a higher purity of liquor to the white crystallizer, it would not be possible to extract all available dextrose by means of the raw and first greens crystallizations.

The present invention contemplates, as an optional step, the reconversion of the first greens before crystallization in order to increase dextrose content. If the white greens had too high a purity which would result in increased purity of the first greens, the amount of dextrose polymerized to non-crystallizable sugars in the reconversion would be increased since the reconversion not only converts polysaccharides to dextrose but also tends, particularly where there is an excess of dextrose present, to polymerize the dextrose present to the higher molecular weight sugars. That is, in conversion two reactions take place simultaneously: depolymerization of polysaccharides to the monosaccharide, which is the desired reaction; and polymerization of the monosaccharide, dextrose, to higher molecular weight sugars, which is not desired. Whether one reaction or the other predominates, depends upon the quantitative relations of the sugars in the solution. Hence, a reconversion operation is most efficient from the economic point of view when the dextrose content of the mother liquor is low.

Moreover, it would be futile to increase the purity of the first greens by reconversion, with the expense entailed by such operation, if such purity were further raised by the addition of a high purity liquor to such a point that there would be in the hydrol crystallizable dextrose but in quantity insufficient to warrant a fourth crystallizing operation.

In the present process the purities are adjusted so that under ordinary conditions, at least, all of its crystallizable dextrose, including that obtained by reconversion of first greens is recoverable in three crystallizing operations, one of which involves recrystallization of melted sugar; and this result is obtained without increasing the cost of production over that of a two-crystallization process, which latter process, will, it is true, yield the same amount of dextrose from the same amount of starch but gives a dextrose of a quality inferior to that obtainable by the process of the present process.

(5) The impurities in a starch converted dextrose solution, at different stages in the crystallizing process, differ not only in quantity but also qualitatively. The adsorbable impurities are of such character as to be difficult to remove from the sugar by purging and washing, (hence the necessity of adsorption treatments); and it is these impurities, which, if allowed to remain in the solution even in small quantities, most seriously affect the color of the sugar. The present process contemplates, as a possibility, the use of activated vegetable carbons followed by filtering operations; but preferably the adsorption treatment is accomplished by the use of bone char; and in accordance with the present invention, the bone char is used in such a manner as to confine the sweet water, that is, the waters derived from flushing the bone black at intervals—the return of sweet waters being necessary for economic reasons in order to recover the sugar liquor entrapped in the bone—to the first greens crystallizing system, so that the portions of the adsorbed impurities which are washed from the bone in the "sweetening off" procedure, will not contaminate the white crystallizing system, either directly or indirectly through their presence in the raw crystallizing system. Fresh bone only is used in the white crystallizing system. The partially spent bone from the white crystallizing system is used with or, preferably, without "sweetening off," for the treatment of the liquor going to the raw crystallization, and is afterward used for treatment of the first greens. At this last stage of the process, the bone is sweetened off, preferably, for the first time, and the sweet water returned to the first greens crystallizing system, preferably to vacuum pan 22. Thus, none of the loosely adsorbed impurities washed from the bone by sweetening off come into contact either with the sugar of the white crystallization or that of the raw crystallization.

(6) It will be understood that by recrystallizing in the white crystallizing system, a liquor of relatively high purity (which for reasons above stated should not be too high), and by crystallizing this liquor at a low density, which is possible because of its high purity, the massecuite may be readily purged of most of its mother liquor, leaving only a small amount of residual mother liquor which will be of relatively high purity, so that only a small amount of water will be required for washing. This results not only in a whiter and purer sugar, but in a sugar having a higher lustre, since washing produces a certain amount of erosion of the crystals. Because of the high purity of the wash water, it is reused in the white crystallizing system, preferably, and is not returned to the raw or first greens systems. It is entirely feasible to reuse this high purity water in the white crystallization because the residuum of adsorbable impurities has been very effectively removed from the liquor before crystallization by contact with fresh bone used only until partially spent.

The invention is disclosed in a preferred embodiment in the accompanying drawing which is a flow sheet of the process.

Referring to the drawing, starch is converted in the converter 10, by the usual method to give a dextrose solution of 89%–92%, preferably 90% purity (reducing sugar calculated as dextrose). This liquor is neutralized and filtered at 11, put through a bone filter at 12, concentrated to 30° Baumé in vacuum pan 13, run through a bone filter at 14, and concentrated to 39°–40° Baumé, preferably 39.5° Baumé, in the finishing pan 15. The liquor is then cooled in the cooler 16 so that when mixed with solid phase from the first greens crystallization and white greens from the white crystallization, it will have a temperature of about 105° F. The cooled liquor is crystallized in crystallizer 17, provided (which is the case with all crystallizers used in the process) with the usual helicoidal agitator and water jacket for controlling temperature. During the crystallizing operation, which requires about 155–180, preferably 160, hours, the temperature is reduced to about 68°–72°, preferably 70° F. The massecuite is then purged in centrifugal machines 18, and the mother liquor (first greens) having a purity of about 80% (76%–80%) goes to the reconverter 19 where it is reconverted, preferably in accordance with the method disclosed in United States Patent No. 2,109,585, referred to above, to a purity of about 85%–86%. The reconverted liquor is neutralized and filtered at 20, passed through the bone char filter 21, concentrated to 30° Baumé in the vacuum pan 22, passed through the bone char filter 23, and concentrated to 40° Baumé in vacuum pan 24. The liquor is cooled in cooler 25 so that when mixed with foots in the first greens crystallizer 26, the mixture will have a temperature of about 100° F. About 26%–30% of each batch of massecuite in crystallizer 26 is left for seeding the next succeeding batch. The foots contain about 55% by weight of solid phase, and the crystallizing operation requires about 8 days. The massecuite from crystallizer 26, reserving foots for the next crystallizing operation, is purged in the centrifugal machines 27, giving a hydrol which is discharged from the process, having a purity of about 70%. The temperature in the first greens crystallizer is reduced to about 63°–67°, preferably 65° F. The second sugar from centrifugal machines 27, having a purity of about 95%, goes to a mixer 28 which also receives white greens from the white crystallizing system having a purity of about 88%–90%. The white greens and second sugar are mixed in the mixer 28, and this mixture goes to the raw crystallizer 17; assuming a usual batch of 105,000 pounds to a crystallizer, the batch for the raw crystallizer 17 will consist of 53,700 pounds of solid phase and 51,300 pounds of liquor, the latter consisting of converter liquor and white greens.

The raw sugar from the centrifugal machines 18, having a purity of about 96%, goes to the melter 29, where it is melted with enough wash water, as will be described, to give the liquor a density of 30° Baumé. This liquor is passed through the bone char filter 30, then to vacuum pan 31 where it is concentrated to 38° Baumé. The concentrated liquor is cooled at 32 and introduced into the white crystallizer 33 on foots consisting of about 25% of the last batch, the foots consisting of about 60% solid phase and 40% liquid phase. The liquor from the vacuum pan 31 is cooled at 32 to such temperature that when mixed with the foots, the mixture will have a temperature of about 105° F. This temperature is reduced to 75°–85°, preferably 80° F., during the crystallizing operation which requires 84½ to 96 hours. The massecuite from the white crystallizer 33, reserving seed for the next batch, is discharged to centrifugal machines 34. The mother liquor from these centrifugal machines (white greens), having a purity of 88%–90%, goes to the mixer 28, and then to the raw crystallizer 17, as above described. The purged sugar in the centrifugal machines is washed with water, the quantity of which is about one-half of the quantity of water ordinarily used for washing a first sugar. The washed sugar, discharged from the centrifugal machines, is dried in the usual manner. The wash water from the centrifugal machines 34, having a purity of about 90%, is introduced into the melter 29 of the white crystallizer system.

The bone char in filter 30, designated on the flow sheet as "Bone No. 1" is freshly activated bone char. When only partially spent, that is, while still capable of adsorbing impurities, it is used in the bone char filter 14 of the raw crystallization, as indicated by the legend "Bone No. 2." It is then used in the first bone char filter 12 of the raw crystallization system, then in the second bone char filter 23 of the first greens crystallization system, and finally in the first bone char filter 21 of the first greens crystallizer system. Here the bone is sweetened off with water at intervals and the sweet water sent to vacuum pan 22. By this arrangement the sweet water with its adsorbed impurities is kept within the first greens crystallizer system. These impurities are discharged from the system with the hydrol from centrifugal machines 27.

It will be understood that the operating data given in the above description of a preferred embodiment of the invention are typical and informative merely and are not to be regarded as limiting the invention to these particulars. The intention is to cover by patent all equivalents and all modifications within the scope of the appended claims.

This application is a continuation in part of copending application of Charles J. Copland, Serial No. 142,639, filed May 14, 1937.

I claim:

1. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: melting the centrifuged sugar from the raw crystallization, with its residual mother liquor and without washing; crystallizing the melted sugar in the white crystallizing operation; and washing the centrifuged sugar from the white crystallization to remove residual mother liquor.

2. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: melting the centrifuged sugar from the raw crystallization, with its residual mother liquor and without washing; crystallizing the melted sugar in the white crystallizing operation; washing the centrifuged sugar from the white crystallization to remove residual mother liquor; and, as the process is continued, mixing with converter liquor going to raw crystallizations greens from the white crystallizations.

3. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: melting the centrifuged sugar from the raw crystallization, with its residual mother liquor and without washing; crystallizing the melted sugar in the white crystallizing operation; washing the centrifuged sugar from the white crystallization to remove residual mother liquor; and returning the wash water from one white crystallization to the next as the process is continued.

4. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: melting the centrifuged sugar from the raw crystallization with its residual mother liquor and without washing; passing the melted sugar through fresh bone char; crystallizing the liquor in the white crystallizing operation; washing the centrifuged sugar from the white crystallization to remove residual mother liquor; and, as the process is continued, utilizing the bone used for treating the liquor to the white crystallization, when partially spent, for treating the liquors going to the raw and first greens crystallizations.

5. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: centrifuging all of the raw crystallization massecuite; melting this sugar with its residual impurities and without washing; crystallizing this liquor in the white crystallizing operation; washing the centrifuged sugar from the white crystallization to remove residual mother liquor; and, as the process is continued, using as seed for the raw crystallization centrifuged sugar from the first greens crystallization.

6. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: centrifuging all of the raw crystallization massecuite; melting this sugar with its residual impurities and without washing; crystallizing this liquor in the white crystallizing operation; washing the centrifuged sugar from the white crystallization to remove residual mother liquor; and, as the process is continued, using as seed for the raw crystallization unwashed centrifuged sugar from the first greens crystallization.

7. In the production of high purity crystalline dextrose hydrate from starch converted solutions by the process of crystallization in motion in which converter liquor is given a raw crystallization, the first greens crystallized, the sugar from the raw crystallization recrystallized in a white crystallization, and the massecuites centrifuged to remove most of their mother liquor, the improvement which comprises: centrifuging all of the raw crystallization massecuite; melting this sugar with its residual impurities and without washing; crystallizing this liquor in the white crystallizing operation; washing the centrifuged sugar from the white crystallization to remove residual mother liquor; using as seed for the raw crystallization, as the process is continued, centrifuged sugar from the first greens crystallization; and returning white greens to the raw crystallization.

8. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: centrifuging all of the raw crystallization massecuite; melting this sugar with its residual impurities and without washing; crystallizing this liquor in the white crystallizing operation; washing the centrifuged sugar from the white crystallization to remove residual mother liquor; using as seed for the raw crystallization, as the process is continued, unwashed centrifuged sugar from the first greens crystallization; and reusing white greens in the raw crystallization.

9. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: centrifuging all of the raw crystallization massecuite; melting this sugar with its residual impurities and without washing; crystallizing this liquor in the white crystallizing operation; reconverting the first greens before crystallization; washing the centrifuged sugar from the white crystallization to remove residual mother liquor; using as seed for the raw crystallization, as the process is continued, centrifuged sugar from the first greens crystallization; and returning white greens to the raw crystallization.

10. In the production of high purity crystalline dextrose hydrate from starch converted solutions by the process of crystallization in motion and temperature reduction in which converter liquor is given a raw crystallization, the first greens crystallized both liquors at about 40° Baume, the sugar from the raw crystallization recrystallized in a white crystallization, and the massecuites centrifuged to remove most of their mother liquor, the improvement which comprises: centrifuging all of the raw crystallization massecuite; melting this sugar with its residual impurities and without washing; recrystallizing this liquor in the white crystallizing operation at a substantially lower density than the liquors used for the raw and first greens crystallizations; washing the centrifuged sugar from the white crystallization to remove residual mother liquor; using as seed for the raw crystallization, as the process is continued, centrifuged sugar from the first greens crystallization; and returning white greens to the raw crystallization.

11. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: centrifuging all of the raw crystallization massecuite; melting this sugar with its residual impurities and without washing; crystallizing this liquor in the white crystallization; washing the centrifuged sugar from the white crystallization to remove residual mother liquor; using as seed for the raw crystallization, as the process is continued, centrifuged sugar from the first greens crystallization; returning white greens to the raw crystallization; passing the liquor going to the white crystallization through fresh bone char; using this char, when partially spent, for treatment first of liquor going to the raw crystallization, then of first greens; washing the bone char with water only while being used for treatment of first greens; and returning the sweet water to the first greens crystallization.

12. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: passing the liquor going to the white crystallization through fresh bone char; using this bone, when partially spent, for treatment first of liquor going to the raw crystallization and then of first greens; washing the bone char only when used for treatment of first greens; and returning the sweet water to the first greens crystallization.

13. In the production of high purity crystalline dextrose hydrate from starch converted dextrose solutions by the process of crystallization in motion and temperature reduction in which dextrose containing liquors of different purities are separately crystallized, the improvement which comprises: passing the liquor of highest purity through fresh bone char which is not washed at this stage; using this bone char for treatment of a liquor of lesser purity; washing the bone char at this latter stage of the process; and returning the sweet water to a subsequent crystallization of the lesser purity liquor.

14. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: centrifuging all of the massecuite from the raw crystallizer; melting the sugar and recrystallizing in the melt the white crystallizing operation; and, as the process is continued, using sugar from the first greens crystallizations for seeding raw crystallizations.

15. In the production of high purity crystalline dextrose hydrate from starch converted solutions by the process of crystallization in motion and temperature reduction in which converter liquor is given a raw crystallization, the first greens crystallized, the sugar from the raw crystallization recrystallized in a white crystallization, and the massecuites centrifuged to remove most of their mother liquor, the improvement which comprises: centrifuging all of the massecuite from the raw crystallizer; melting the sugar and recrystallizing the melt in the white crystallization; using sugar from the first greens crystallization for seeding the raw crystallization, as the process is continued; and mixing the white greens with the converter liquor going to the raw crystallization.

16. The process of crystallizing dextrose hydrate from starch converted dextrose solutions by the method of crystallization in motion and temperature reduction which comprises: crystallizing the converter liquor in a raw crystallization; centrifuging all of the massecuite; crystallizing the first greens, using a part of each massecuite for seeding the next bath; centrifuging, without washing, massecuite from the first greens crystallization and, as the process is continued, using the sugar for seeding the raw crystallization; melting without washing, the centrifuged sugar from the raw crystallization; crystallizing the melted sugar in a white crystallization; centrifuging the massecuite, reserving a part of each massecuite for seeding the next batch; washing the sugar with water to remove residual mother liquor; returning the wash water to subsequent white crystallizing operations; and mixing white greens with the converter liquor going to the raw crystallization.

17. The process of crystallizing dextrose hydrate from starch converted dextrose solutions by the method of crystallization in motion and temperature reduction which comprises: crystallizing converter liquor having a purity of about 89%–92%, in a raw crystallization at a density of about 39°–40° Baumé; centrifuging all of the massecuite to give a raw sugar of about 96% purity and first greens of about 76%–80% purity; crystallizing the first greens at a density of about 40° Baumé; centrifuging, without washing, first greens massecuite, reserving a part of each batch for seeding the next batch; using this second sugar for seeding the raw sugar crystallization, as the process is continued; melting, without washing the centrifuged raw sugar; crystallizing the liquor at a density of about 38° Baumé; centrifuging massecuite from the white crystallization, reserving a part of each batch for seeding the next batch mixing the white greens with the second sugar going to the raw crystallization; washing the centrifuged sugar with water to remove residual mother liquor; returning the wash water at about 95% purity to the white crystallizations; and mixing the white greens having a purity of about 88%–90%, with the converter liquor going to the raw crystallization.

18. The process of crystallizing dextrose hydrate from starch converted dextrose solutions by the method of crystallization in motion and temperature reduction which comprises: crystallizing converter liquor having a purity of about 89%–92%, in a raw crystallization at a density of about 39°–40° Baumé; centrifuging all of the massecuite to give a raw sugar of about 96% purity and first greens of about 76%–80% purity; reconverting the first greens to a purity of about 85%–86%; crystallizing the reconverted liquor at a density of about 40° Baumé; centrifuging, without washing, the first greens massecuite, reserving a part of each batch for seeding the next batch; using the sugar for seeding the raw sugar crystallization as the process is continued; melting, without washing, the centrifuged raw sugar; recrystallizing the liquor at a density of about 38° Baumé; centrifuging massecuite from the white crystallization, reserving a part of each batch for seeding the next batch; washing the centrifuged sugar with water to remove residual mother liquor; returning the wash water at about 95% purity to the white crystallizations, and mixing the white greens having a purity of about 88%–90%, with the converter liquor going to raw crystallizations.

19. Process of obtaining high purity crystalline dextrose hydrate from starch converted dextrose solutions by the method of crystallization in motion with temperature reduction which comprises: giving the converter liquor a raw sugar crystallization and centrifuging the massecuite; melting the sugar from the raw sugar crystallization, giving it adsorption treatment, recrystallizing it and centrifuging the massecuite for the production of a high purity crystalline dextrose; and concentrating the greens from the raw sugar crystallization, crystallizing the same, centrifuging the massecuite and using the resultant sugar for seeding subsequent raw sugar crystallizing operations.

20. Process of obtaining high purity crystalline dextrose hydrate from starch converted dextrose solutions by the method of crystallization in motion with temperature reduction which comprises: giving the converter liquor a raw sugar crystallization and centrifuging the massecuite; melting the sugar from the raw sugar crystallization, giving it adsorption treatment, re-crystallizing it and centrifuging the massecuite for the production of a high purity crystalline dextrose; concentrating the greens from the raw sugar crystallization, crystallizing the same, centrifuging the massecuite and using the resultant sugar for seeding subsequent raw sugar crystallizing operations; and using the greens from the high purity dextrose crystallization, mixed with fresh converter liquor for subsequent raw sugar crystallization as the process is continued.

CHARLES JAMES COPLAND.